(12) United States Patent
Gnap et al.

(10) Patent No.: US 12,125,007 B2
(45) Date of Patent: Oct. 22, 2024

(54) FAST BLOCKCHAIN PAYMENT METHOD AND SYSTEM

(71) Applicant: NEC Laboratories Europe GmbH, Heidelberg (DE)

(72) Inventors: Sven Gnap, Zurich (CH); Kari Kostiainen, Zurich (CH); Ghassan Karame, Heidelberg (DE); Srdjan Capkun, Zurich (CH)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/282,557

(22) PCT Filed: Sep. 27, 2022

(86) PCT No.: PCT/EP2022/076860
§ 371 (c)(1),
(2) Date: Sep. 18, 2023

(87) PCT Pub. No.: WO2023/083525
PCT Pub. Date: May 19, 2023

(65) Prior Publication Data
US 2024/0161071 A1 May 16, 2024

(30) Foreign Application Priority Data
Nov. 11, 2021 (EP) .................................. 21207778

(51) Int. Cl.
*G06Q 20/10* (2012.01)
*G06Q 20/38* (2012.01)
(Continued)

(52) U.S. Cl.
CPC ......... *G06Q 20/10* (2013.01); *G06Q 20/3825* (2013.01); *G06Q 20/3827* (2013.01);
(Continued)

(58) Field of Classification Search
CPC ............... G06Q 20/10; G06Q 20/3825; G06Q 20/3827; G06Q 20/3829; G06Q 20/389; G06Q 20/4014
See application file for complete search history.

(56) References Cited

U.S. PATENT DOCUMENTS

2019/0139037 A1* 5/2019 Khalil .................... H04L 9/3247
2020/0053054 A1* 2/2020 Ma ........................ H04L 9/3239
(Continued)

FOREIGN PATENT DOCUMENTS

CN 111242591 A 6/2020
WO WO-2021048056 A1 * 3/2021

OTHER PUBLICATIONS

Boneh et. al, "Short Signatures from the Weil Pairing", Jul. 30, 2004.*
(Continued)

*Primary Examiner* — Steven S Kim
(74) *Attorney, Agent, or Firm* — Leydig, Voit & Mayer, Ltd.

(57) ABSTRACT

A blockchain payment involves a transfer of funds from an account of a user to a collateral account of a service provider. The service provider receives a payment intent from the user including a payment index, a random payment ID, and an address of the collateral account. The service provider replaces the address by a commitment and provides the modified payment intent to a majority of statekeepers of a blockchain, receives payment approvals from the statekeepers, each payment approval including the modified payment intent signed with a private key of a respective statekeeper, evaluates the received payment approvals, aggregates successfully evaluated payment approvals, and transmits the aggregation result to the user. The service provider receives a final transaction created by the user after having verified the aggregation result, verifies that the user correctly con-
(Continued)

structed the final transaction, and accepts the payment in case of successful verification of the final transaction.

13 Claims, 6 Drawing Sheets

(51) Int. Cl.
  *G06Q 20/40* (2012.01)
  *H04L 9/00* (2022.01)
(52) U.S. Cl.
  CPC ....... *G06Q 20/3829* (2013.01); *G06Q 20/389* (2013.01); *G06Q 20/4014* (2013.01); *H04L 9/008* (2013.01)

(56) References Cited

U.S. PATENT DOCUMENTS

| | | | |
|---|---|---|---|
| 2021/0073913 A1* | 3/2021 | Ingargiola | H04L 67/104 |
| 2022/0284428 A1* | 9/2022 | Zhou | G06Q 20/40 |
| 2023/0134651 A1* | 5/2023 | Agbamu | G06V 40/172 |
| | | | 705/325 |

OTHER PUBLICATIONS

Mavroudis et. al, "Snappy: Fast On-chain Payments with Practical Collaterals", Feb. 26, 2020.*
Boneh et al, "Zether: Towards Privacy in a Smart Contract World", Feb. 26, 2019.*

* cited by examiner

| Symbol | Description |
|---|---|
| *Customers* | |
| $\hookrightarrow \mathcal{L}_c$ | Ordered list of customer $c$'s approved transactions. |
| $\hookrightarrow \mathcal{S}_c$ | Set of customer $c$'s approved but pending transactions (i.e. transactions which await inclusion into the blockchain $\mathcal{BC}$). Note that $\mathcal{S}_c \subseteq \mathcal{L}_c$. |
| $\hookrightarrow \mathcal{BC}[c]$ | Subset of all transactions on the blockchain that contain customer $c$ as the sender. |
| *Merchants* | |
| $\hookrightarrow P[c]$ | Table containing lists of all approved payment intents of the statekeeper for a customer $c$. |
| *Statekeepers* | |
| $\hookrightarrow R[s]$ | Table indicating how much collateral the merchant can claim from a statekeeper $s$. |

Fig. 1

| Function | Inputs | Outputs |
| --- | --- | --- |
| *Off-Chain* | | |
| ↳ *CreateTransferTx* | Sender pk $y$<br>Receiver pk $\bar{y}$<br>Sender sk $x$<br>Sender balance $b_f$<br>Payment amount $b$ | Ciphertexts $(c, \bar{c})$<br>Proof $\pi_{trans}$<br>Signature $\sigma_{trans}$ |
| ↳ *CreateAnonTransferTx* | Anonymity set $\mathbb{U}$<br>Sender index $i_f$<br>Receiver index $i_{to}$<br>Sender sk $x$<br>Sender balance $b_f$<br>Payment amount $b$<br>State of the ZSC | Ciphertexts $\{c_1, \ldots, c_n\}$<br>Zether nonce $u$<br>Proof $\pi_{trans}$ |
| ↳ *CreateLockTx* | sk $x$<br>Ethereum address<br>State of the ZSC | Signature $\sigma_{lock}$ |
| *ZSC* | | |
| ↳ Transfer | Sender pk $y$<br>Receiver pk $\bar{y}$<br>Ciphertexts $(c, \bar{c})$<br>Proof $\pi_{trans}$<br>Signature $\sigma_{trans}$ | $\top$ or $\bot$ |
| ↳ AnonTransfer | Anonymity set $\mathbb{U}$<br>$\{c_1, \ldots, c_n\}$<br>Zether nonce $u$<br>Proof $\pi_{trans}$ | $\top$ or $\bot$ |
| ↳ Lock | pk $y$<br>Ethereum address<br>Signature $\sigma_{lock}$ | $\top$ or $\bot$ |

Fig. 2

| Field | Symbol | Type | Description |
|---|---|---|---|
| To | $\tau_{to}$ | 160-bit | System addr. |
| From | $\tau_f$ | 160-bit | Arbitrary blockchain addr. |
| Value | $\tau_v$ | Integer | 0 |
| ECDSA Sig. | $v, r, s$ | 256-bits | Tx signature triplet |
| Data | | | |
| ↳ Operation | $\tau_{op}$ | String | e.g., "Pay", "Claim" |
| ↳ Payment Index | $\tau_i$ | Integer | Monotonic counter |
| ↳ Random Payment ID | $\tau_{RPID}$ | 256-bits | Generated VRF Hash |
| ↳ Commitment | $\tau_{c_m}$ | 512-bits | Service provider's committed col. |
| ↳ Signatures | $\tau_A$ | 512-bits | Addr |
| ↳ Quorum | $\tau_q$ | 256-bits | Aggregate signature |
| ↳ Proof | $\pi_{trans}$ | Byte Array | Approving parties |
| ↳ Signature | $\sigma_{trans}$ | 512-bits | User's $\Sigma$-Bullet proof |
| ↳ Nonce | $u$ | 256-bits | User account's signature |
| ↳ Acoounts | | | Customer account's nonce |
| ↳ Confidentiality | $(y, \bar{y})$ | 1024-bits | |
| ↳ Anonymity | $\mathbb{U}$ | Byte Array | Sender/receiver system addr. |
| ↳ Values | | | Anonymity set |
| ↳ Confidentiality | $(c^*, \bar{c}^*)$ | 1024-bits | |
| ↳ Anonymity | $\{c_1^*, \ldots, c_n^*\}$ | Byte Array | Pair of encrypted values |
| | | | Set of encrypted values |

Fig. 3

| Field | Symbol | Description |
|---|---|---|
| *Users* | $C$ | Users |
| ↳ *entry* | $C[c]$ | User c entry |
| ↳ *Collateral* | $C[c].a_c$ | Address of the private collateral account |
| ↳ *Clearance* | $C[c].cl$ | Clearance index |
| ↳ *Finalized* | $C[c].D$ | Finalized Transactions |
| ↳ *entry* | $C[c].D[i]$ | Entry for index $i$ |
| ↳ *Commitment* | $C[c].D[i].\tau_{c_m}$ | Service provider's committed address |
| ↳ *RPID* | $C[c].D[i].\tau_{RPID}$ | Random Payment ID |
| ↳ *Signature* | $C[c].D[i].\tau_A$ | Aggregate signature |
| ↳ *Quorum* | $C[c].D[i].\tau_q$ | Approving parties |
| ↳ *Bit* | $C[c].D[i].b$ | Sig. verified flag |
| ↳ *Observed* | $C[c].O$ | Observed approval quora |
| ↳ *entry* | $C[c].O[i]$ | Entry for index $i$ |
| ↳ *Hash* | $C[c].O[i].h$ | Hash of the payment intent |
| ↳ *Trace* | $C[c].T$ | Trace of past settlements |
| ↳ *entry* | $C[c].T[i]$ | Entry for index $i$ |
| ↳ *Nonce* | $C[c].T[i].idx$ | Snappy index of settled transaction |
| ↳ *Remaining* | $C[c].T[i].pool_c$ | Collated balance after settlement |
| *Service Providers* | $M$ | Service providers |
| ↳ *entry* | $M[m]$ | Service provider m entry |
| *Statekeepers* | $S$ | Statekeepers |
| ↳ *entry* | $S[s]$ | Statekeeper $s$ entry |
| ↳ *Collateral* | $S[s].a_s$ | Address of the private collateral account |
| ↳ *Allocation* | $S[s].pool_s[m]$ | Private collateral amount allocated for $m$ |

Fig. 4

# FAST BLOCKCHAIN PAYMENT METHOD AND SYSTEM

CROSS REFERENCE TO RELATED APPLICATIONS

This application is a U.S. National Phase application under 35 U.S.C. § 371 of International Application No. PCT/EP2022/076860, filed on Sep. 27, 2022, and claims benefit to European Patent Application No. EP 21207778.8, filed on Nov. 11, 2021. The International Application was published in English on May 19, 2023 as WO 2023/083525 A1 under PCT Article 21(2).

FIELD

The present invention relates to a method, system and computer-readable medium for fast blockchain payments.

BACKGROUND

Digital currencies implemented as permissionless blockchains such as Ethereum offer a radically different alternative to traditional payment systems. One of the most striking differences is that there is no or only few centralized entities that would control all user account balances or payments. Instead, each transaction is approved by a large and decentralized system where anyone can participate. This provides strong guarantees that prevent entities from censoring payments.

However, such systems are not practical for scenarios such as retail or online payments. In particular, they have high latency and no on-chain privacy, which makes them unusable for small day-to-day payments. There are means to address these shortcomings. The most prominent technique is to leverage smart contracts that provide further functionality. Two types of such systems relevant for retail payments can be identified in addition to standard blockchain payments: those that provide low latency, and those that provide on-chain privacy.

There are multiple techniques to address latency issues through smart contracts. Payment channels enable users to establish a relationship with a single service provider. However, they require separate locked-in collaterals for each such relationship, which is impractical. Payment hubs connect users to multiple service providers, but the locked-in collateral is large and thus not scalable for a higher number of registered users. Sidechains enable payments that are quickly approved by a smaller set of verifying entities, but they introduce additional trust assumptions and high communication complexity. The Snappy payment system (for reference, see V. Mavroudis, K. Wüst, A. Dhar, K. Kostiainen, and S. Capkun: "Snappy: Fast On-Chain Payments with Practical Collaterals", in 27$^{th}$ Annual Network and Distributed System Security (NDSS) Symposium 2020, 23-26 Feb. 2020, San Diego, CA, USA. https://www.ndss-symposium.org/wp-content/uploads/2020/02/24049-paper-.pdf), on the other hand, uses small user collaterals, but it violates the strong censorship-resilience guarantees of permissionless blockchains.

On the other side, the Zether payment system (for reference, see B. Bünz, S. Agrawal, M. Zamani, and D. Boneh: "Zether: Towards Privacy in a Smart Contract World, 07 2020, pp. 423-443. https://crypto.stanford.edu/—buenz/papers/zether.pdf) addresses on-chain privacy by providing confidential and anonymous transactions. It has much stronger security and privacy guarantees than standard blockchain transactions, however its payments are slow because the system does not provide any mechanism to address latency issues.

It can be observed that most systems only provide very specific additional functionality, while often violating other properties. In the current state of the art, there is no system that provides (a) fast payments, (b) resilience to censoring, (c) small collaterals, (d) on-chain privacy, and (e) no additional trust assumptions.

SUMMARY

In an embodiment, the present disclosure provides a computer-implemented method for fast blockchain payment, the payment involving a transfer of funds from an account of a user to a private collateral account of a service provider, the method comprising: receiving, by the service provider, a private payment intent from the user, the private payment intent including a payment index, a random payment ID, and an address of the private collateral account of the service provider; modifying, by the service provider, the private payment intent by replacing the address of the private collateral account of the service provider by a commitment and providing the modified payment intent to a majority of statekeepers of a blockchain; receiving, by the service provider, payment approvals from statekeepers of the blockchain, each payment approval including the modified payment intent signed with a private key of a respective statekeeper; evaluating, by the service provider, the received payment approvals, aggregating successfully evaluated payment approvals, and transmitting the aggregation result to the user; and receiving, by the service provider, a final transaction created by the user after having verified the aggregation result, verifying that the user correctly constructed the final transaction according to a given protocol, and accepting the payment in case of successful verification of the final transaction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 is a table showing Snappy data structures used in a system according to embodiments of the present invention;

FIG. 2 is a table showing Zether functions used in a system according to embodiments of the present invention;

FIG. 3 is a table showing data structures of a transaction format used in a system according to embodiments of the present invention;

FIG. 4 is a table showing data structures of a smart contract used in a system according to embodiments of the present invention;

DETAILED DESCRIPTION

Figure 5:
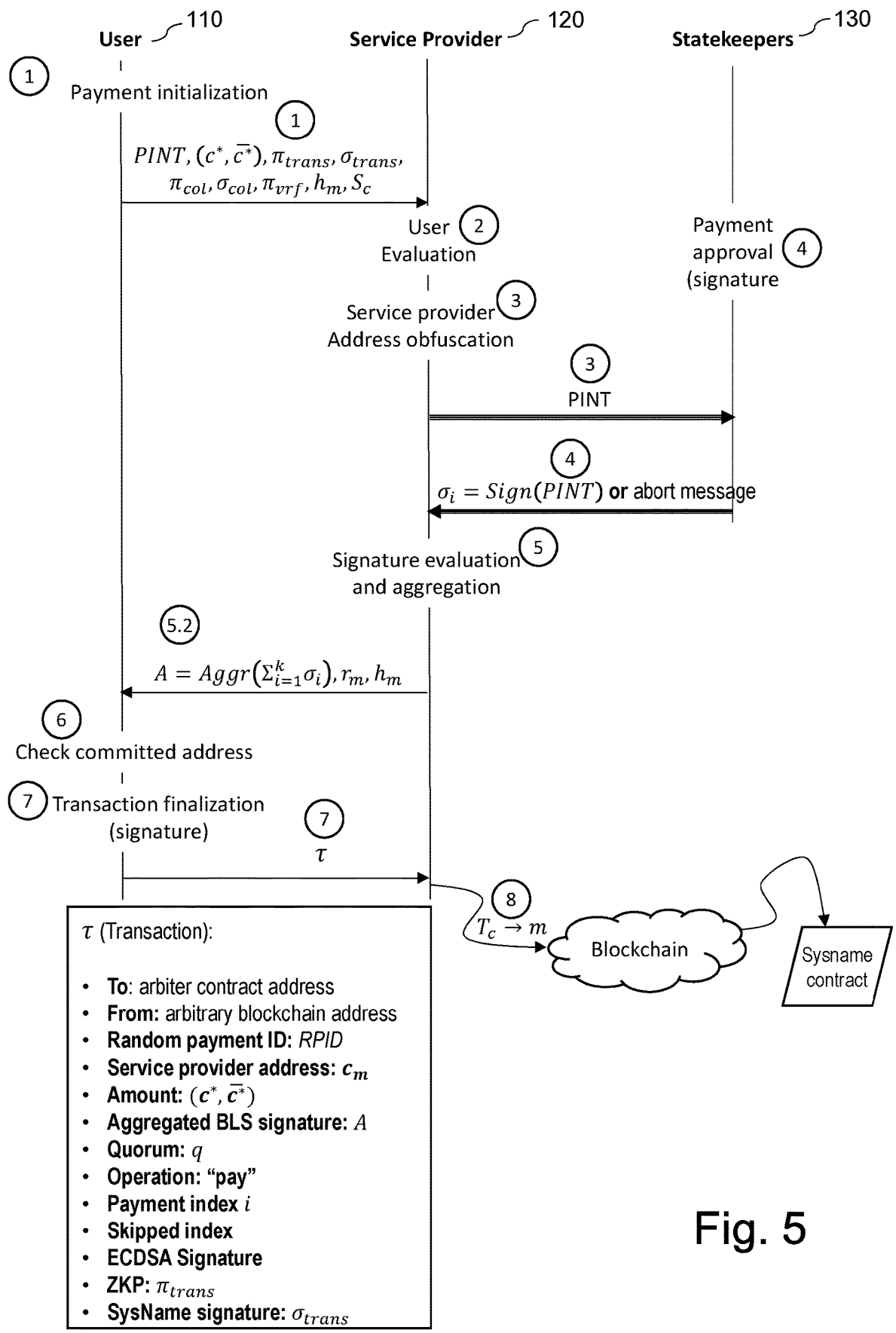
FIG. 5 is a schematic view illustrating a payment process between a user and a service provider in accordance with an embodiment of the present invention.

In an embodiment, the present invention improves and further develops a method and a system for fast blockchain payments in such a way that at least some of the above mentioned shortcomings are mitigated or overcome.

In accordance with an embodiment, the present invention provides a computer-implemented method for fast blockchain payment, the payment involving a transfer of funds from an account of a user to a private collateral account of a service provider, the method comprising: receiving, by the service provider, a private payment intent from the user, the private payment intent including a payment index, a random payment ID and an address of the service provider's private collateral account; modifying, by the service provider, the payment intent by replacing the address of the service provider's collateral account by a commitment and providing the modified payment intent to a majority of a blockchain's statekeepers; receiving, by the service provider, payment approvals from blockchain's statekeepers, each payment approval including the modified payment intent signed with a private key of the respective statekeeper; evaluating, by the service provider, the received payment approvals, aggregating the successfully evaluated payment approvals, and transmitting the aggregation result to the user; and receiving, by the service provider, a final transaction created by the user after having verified the aggregation result, verifying that the user correctly constructed the final transaction according to a given protocol, and accepting the payment in case of successful verification of the final transaction.

Furthermore, in accordance with another embodiment, the present invention provides a system for fast blockchain payment and a non-transitory processor readable medium for fast blockchain payment.

Embodiments of the present invention provide blockchain payment methods and systems, which take a hybrid approach that provides both fast and private payments with practical collaterals, as well as strong security guarantees including censorship-resilience and no additional trust assumptions.

According to an embodiment of the invention, the random payment ID of the user's payment intent is generated by computing a verifiable random function, VRF, hash of the payment index. In this regard, it is noted that a verifiable random function (VRF) is a public-key version of a keyed cryptographic hash (for reference, see S. Goldberg, L. Reyzin, D. Papadopoulos, and J. Včelák, "Verifiable Random Functions (VRFs)," Internet Engineering Task Force, Internet-Draft draft-irtf-cfrg-vrf-09, May 2021, work in Progress. [Online]. Available: https://datatracker.ietf.org/doc/html/draft-irtf-cfrg-vrf-09). Anyone in possession of the public key pk can verify the correctness of the hash, but only the holder of the secret key sk can generate the hash. More precisely, given an input value x, the holder of the private key sk can compute the hash y=VRFhash(sk, x) for input x. The holder of the private key can also compute a matching proof $\pi$=VRFprove(sk, x). A key property of VRFs is that the hashing algorithm is deterministic in the sense that it always produces the same output y given the same pair of inputs (sk, x). Using the public key and the proof, one can verify that the hash was correctly computed. Given pk, x and $\pi$ the hash is valid if VRFverify(pk, x, $\pi$) outputs valid. Anyone can deterministically obtain the VRF output y from the proof $\pi$ by computing y=VRFproof2hash($\pi$).

Embodiments of the present invention take advantage of one or more of the following VRFs' properties:

Trusted uniqueness: Assuming that the keys were generated in a trustworthy manner, i.e. with correct randomness, a computationally bounded adversary cannot find pk, x, two different hash outputs y1 and y2, two proofs $\pi$1 and $\pi$2 such that VRFverify(pk, x, $\pi$1) and VRFverify(pk, x, $\pi$2) both output valid.

Trusted collision resistance: Assuming that the keys were generated in a trustworthy manner, it should be computationally infeasible to find x1 and x2 that have the same hash output even if the adversary knows the secret key.

Full pseudorandomness: An adversarial verifier cannot distinguish a genuine hash output y from a random one without knowing the proof of the genuine hash. The adversary is allowed at any time to observe the output hash and proof of a variety of chosen inputs.

According to an embodiment of the invention, the service provider's modification of the payment intent received from the user includes replacing the address of the service provider's collateral account by the commitment $c_m=C(m,r_m)$, where m is the address of the service provider's collateral account, $r_m$ is a random blinding factor, and C is a commitment function. In general, the goal of cryptographic commitments is to commit to a value that remains hidden, and reveal it at a later point in time. Pedersen commitments is one particular variant of such schemes. It provides commitments that are perfectly hiding (a computationally unbounded adversary cannot learn anything about the original message) and computationally binding (a computationally bounded adversary cannot compute two distinct messages for the same commitment). Furthermore, Pedersen commitments are homomorphic, that means two commitments can be combined without requiring the knowledge of neither the original messages nor the blinding factors. Details about Pedersen commitments are describe in T. P. Pedersen, "Non-interactive and information-theoretic secure verifiable secret sharing," in Advances in Cryptology—CRYPTO '91, 1992, pp. 129-140, which is hereby incorporated herein by reference).

According to an embodiment of the invention, it may be provided that the service provider evaluates a private payment intent received from the user by verifying the correctness of a zero-knowledge proof computed by the user to show that the user's balance is sufficient for executing the payment.

According to an embodiment of the invention, it may be provided that the service provider evaluates a private payment intent received from the user by verifying the correctness of a zero-knowledge proof computed by the user over a user's collateral balance to show that the sum of all pending payments including the current payment is less than the user's current collateral balance.

According to an embodiment of the invention, the payment approvals from the blockchain's statekeepers may include a BLS signature computed by the respective statekeeper over the modified payment intent using the secret key of the respective statekeeper. BLS (Boneh-Lynn-Shacham) digital signature (for reference, see D. Boneh, B. Lynn, and H. Shacham, "Short signatures from the Weil pairing," in Advances in Cryptology—ASIACRYPT 2001, 2001, pp. 514-532) is a signature scheme that provides short and secure digital signatures. Furthermore, it allows to aggregate multiple signatures $\sigma_1, \ldots, \sigma_n$ of different signers into one single signature. For simplicity, it can be assumed that the user is given functions Sign(sk, m), Vf(pk, m, $\sigma$), AggrSig($\{\sigma_1, \ldots, \sigma_n\}$), AggrPk($\{pk_1, \ldots, pk_n\}$) which implement signature creation, verification, and signature/public key aggregation, respectively.

According to an embodiment of the invention, the service provider, upon receiving payment approvals from at least half of the statekeepers, verifies the statekeepers' signatures of the modified payment intent using the respective statekeeper's public key and aggregates the successfully verified signatures to obtain an aggregated approval signature.

According to an embodiment of the invention, a smart contract running in the blockchain may be used to administer collateral accounts of the user, the service provider and each of the blockchain's statekeepers, wherein the smart contract stores a dictionary that maps account addresses to ElGamal homomorphic encrypted values. Smart contracts are pieces of software that run on the blockchain and provide an interface via which to interact with the data. In other words, a smart contract is a computer program or transaction protocol that is configured to automatically execute and operate on the blockchain. In some embodiments, a smart contract is a processor-executable program (code) stored on a non-transitory processor readable medium that, when executed by processing circuitry, causes the processing circuitry to carry out program functions. The code is available (i.e. can be inspected) to all the members present on the network. A person of ordinary skill in the art would recognize that a "smart contract" is a technical aspect of blockchain networks used for, e.g., automation, and not a legal instrument or other means of constraining human activity.

According to an embodiment of the invention, the smart contract running in the blockchain, upon receipt of the payment, the following actions, may finalize the payment which transfers funds from the user to the service provider. Upon success, the smart contract may store the random payment ID, the service provider's committed address, the aggregated approval signature, and the quorum of the approving statekeepers in a list of the user's finalized transactions.

According to an embodiment of the invention, it may be provided that the user's final transaction in the smart contract is executed using encrypted payment amounts on private accounts of the user and the service provider.

According to an embodiment of the invention, it may be provided that the smart contract running in the blockchain is used to process settlement requests initiated by the service provider in case the transaction does not appear on the blockchain after a predefined or configurable time.

According to an embodiment of the invention, it may be provided that the service provider directs a settlement request to the user or to a statekeeper to be refunded through a confidential payment either from the private collateral account of the user or the private collateral account of the respective statekeeper.

There are several ways how to design and further develop the teaching of the present invention in an advantageous way. To this end, it is to be referred to the dependent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained.

FIGS. 1-4 are illustrative of the notification used in the embodiments of the present invention described hereinafter in detail.

Apart from normal blockchain transactions, there are countless other payment systems that sit on top of a blockchain as smart contracts. These systems introduce arbitrary additional functionality, mainly to provide specific properties that are not provided by normal blockchain transactions. In the current state of the art, one can categorize three major types of payment systems that are primarily relevant to scenarios such as retail or online stores.

1. Standard blockchain payments. In Ethereum, for instance, such a transaction simply contains the sender, receiver, payment amount and a digital signature created by the sender's account. Once the transaction is mined and finalized on the blockchain, the payment value is transferred from the sender's account to the receiver's account.

Due to their simplicity, such payments have low fees but are slow, as it is necessary to wait (usually several minutes) until the transaction is safely finalized on the blockchain. As such, they are not practical for small, fast payments during day-to-day use. However, the main advantage over e.g. credit card providers is that these blockchain payments are decentralized, and hence there is no particular entity that could block the transactions.

2. Fast blockchain payments. To address latency issues, there are systems implemented as smart contracts that allow fast approval of payments. The main idea is for users to deposit a collateral to a smart contract. This collateral is used to provide a guarantee to a receiving service provider, such that they can accept the payment before it is finalized on the blockchain. There are several systems which use such mechanisms.

Payment channels enable to establish a relationship between a particular user and service provider. Such channels allow to create multiple transactions without submitting all transactions to the blockchain network. In particular, it is possible to combine hundreds or thousands of transactions into a single blockchain transaction. However, such channels are not practical for retail payments because users need to set up a payment channel with every service provider individually. This results in high locked-in collaterals, which is not scalable for users.

Payment hubs, on the other hand, allow users to communicate with several service providers. In this case, users register in a single smart contract that connects them with multiple service providers. During registration, they also need to deposit a collateral as a guarantee. The major drawback in such systems is that the size of the collateral that the hub operator needs to place scales with the total amount of registered users in the system, and hence becomes very large. Thus, such a system is not scalable for larger deployment scenarios.

Sidechains are an alternative that rely on a smaller set of transaction validators. These validators collectively track and approve incoming transactions. However, the main problem with such systems are its trust assumptions. In particular, at least $2/3$ of the validators may be trusted. Furthermore, these systems usually communicate through a BFT (Byzantine fault tolerance) protocol, which has high complexity and is therefore expensive in terms of latency and computational effort.

The Snappy payment system (as already mentioned above), which builds a point of reference for embodiments of the present invention, allows fast approval of payments with small user collaterals. This is achieved through a mechanism where each transaction is approved by a statekeeping entity. Statekeepers act as untrusted entities who collectively track and approve Snappy transactions. It can be assumed that most merchants also act as statekeepers, as this ensures them a fixed transaction fee (in contrast to value-based fees e.g. from credit-card providers). Statekeepers may also deposit a collateral during a one-time registration process.

The major benefit of Snappy is that user collaterals only need to cover a specific user's expenditure, i.e. they do not depend on any other factors. Statekeeper collaterals, on the other hand, scale with the total amount of sales in the system. This is acceptable, because service providers benefit from low, fixed payment fees if they act as statekeepers. These fees are much lower compared to credit card providers.

3. Private blockchain payments. It is possible to achieve on-chain privacy through smart contracts as well. Embodiments of the present invention use the private payment system Zether (as already mentioned above) as point of reference. By using the zero-knowledge proof system ΣBullets, it manages custom accounts that store and transfer encrypted amounts. Hence, it provides confidential (and optionally anonymous) payments on top of permissionless blockchains. Such systems have strong security and privacy guarantees as opposed to standard blockchain payments.

The payment systems mentioned above provide each interesting properties. However, they still have noteworthy limitations and drawbacks.

Vulnerability to censorship. Resilience to censoring is one major motivation to use permissionless blockchains for payments. However, in fast payment systems like payment hubs, sidechains and Snappy, these guarantees are violated. This is because a transaction can be safely accepted only if a majority approval of the statekeeping entities is received. It is recalled that the statekeeping entities are usually other competing service providers. Since statekeepers receive approval requests with the details of the payment intents in plain text, they can perform arbitrary censoring against particular service providers or users. This is a realistic threat in a competitive environment such as retail or online stores. As such, the security properties provided by fast blockchain payment systems that leverage a majority approval are weak and do not provide benefits over other existing systems such as credit card providers—in particular with regards to censoring.

Lack of confidentiality and anonymity. Another particular limitation of fast payment systems is weak privacy. In Snappy, for instance, users register to the system with their main blockchain accounts. Therefore, every transaction is traceable to their identity. All data in such a system is publicly available, and thus allows anyone to perform profiling of all users. This can be abused for example for marketing or political purposes. Such profiling can raise even stronger privacy concerns than for example payments by credit card.

Apart from user profiling, current fast payment systems also disclose essential business information of service providers to the public. In particular, all transaction details are stored publicly in plain text in the smart contract's state. Therefore, it is possible to track each service provider's transactions and thus retrieve information about their sales. In a competitive scenario of retail or online businesses, this is a realistic disadvantage of using such a system.

Security instead of practicality. There are payment systems that do not suffer from the above problems. In particular, private payment systems introduce strong security and privacy guarantees as opposed to fast payment systems. By design, they are resilient to any censoring and do not enable any profiling of its userbase. However, such systems are impractical in real world scenarios such as retail and online payments. In particular, they do not provide any mechanism to reduce approval latency, and hence they suffer from the same latency problems as normal blockchain payments.

In view of the above, the system and the method proposed in accordance with embodiments of the present invention takes a hybrid approach that provides both fast and private payments. According to embodiments, the proposed payment method/system has a further property of being is flexible by design—it is possible to deploy it in different scenarios depending on whether public, confidential or anonymous payments are desired. In particular, it is designed to be resilient to any censoring—no matter whether the public, confidential or anonymous deployment scenario is chosen.

According to an embodiment of the present invention, the payment method/system accepts payments fast similar to Snappy. That is, it provides both payment and settlement protocols, wherein these protocols, as compared to Snappy, are particularly designed around stronger security and privacy guarantees. Furthermore, the processes are compatible with improved, Zether-style private accounts for payments and for collaterals.

In contrast to Snappy, the payment method/system according to embodiments of the present invention provides and administers its own (private) accounts. This allows easier integration of both private payments and private settlements. The administration may be performed by a dedicated smart contract. In addition to Zether-style accounts, the payment method/system according to embodiments of the present invention also introduces a new type of private collateral account. To allow settlement claims to be transferred confidentially, these collateral accounts are administered completely differently compared to general Zether-style accounts.

The exact details of the individual steps in the payment process according to embodiments of the invention are completely changed with respect to Zether. In particular, service providers and users create a new type of payment intent that hides all details and guarantees resilience to any censoring from the statekeepers. Additionally, since all accounts contain encrypted balances, service providers verify zero-knowledge proofs created by users to ensure that the private collateral balance is sufficient to cover the pending payments. Finally, the finalized transaction in the payment system's smart contract is executed using encrypted payment amounts on the private accounts. All of these mechanisms provide fast payments that are secure (censorship-resilient) and private (confidential and anonymous).

According to embodiments of the invention, the settlement process, in contrast to Snappy, may be split into two separate functions for claiming different entities. In particular, a process for claiming users and a process for claiming statekeepers may be provided. In both cases, the processes are completely redesigned to allow service providers to be refunded through confidential payments from the newly introduced private collateral accounts.

All of the mentioned mechanisms contribute to a new, unique payment system with properties that have not been achieved in any previous system. In conclusion, the solution according to embodiments of the invention leads to a system that is fast, censorship-resilient, confidential, anonymous, has small user collaterals, and does not require any additional trust assumptions.

The main technical challenges that need to be solved to build such a new system are as follows:

Censoring

Service providers may require a majority approval for each payment. In particular, statekeepers need to ensure that they have not signed a conflicting transaction for a particular user. Hence, they may require some notion of the user's identity. In previous designs of fast payment systems (Snappy), statekeepers approve payment intents that contain the user's identity, the service provider's identity, and the payment value all in plaintext. This automatically introduces a link of failure, because statekeepers can purposefully censor particular users or service providers. It is recalled that if a service provider does not receive signature from the majority of the statekeepers, they cannot safely accept the payment. This is considered to be a realistic threat in a typical retail payment scenario, where service providers take the role of statekeepers. A set of colluding service providers (statekeepers) could decide to not process any payments of another competing victim service provider. In order to prevent censorship in decentralized payment systems like Snappy, the payment method/system according to embodiments of the present invention is designed to meet the following three high-level goals (a.-c.).

a. Payment value based censoring. The first goal towards censorship-resilience is to hide the payment price. The main problem is that malicious statekeepers may be able to guess the recipient's identity based on the payment price. Certain goods are almost uniquely identifiable according to their price. Therefore, malicious statekeepers could still discriminate against a particular service provider in specific cases. Similarly, in certain scenarios, malicious statekeepers could discriminate against particular users. They could prevent a targeted user from buying some goods if they manage to guess what is purchased. The goal of this mitigation is that statekeepers cannot discriminate against service providers (or users) based on the transaction amount.

b. Service provider identity based censoring. In a simple design like in Snappy, statekeepers receive the service provider's identity in plain text. This is to ensure that nobody can create a second transaction for a different transaction that would conflict with the approved transaction. Therefore, in such a design, the statekeepers can still see who the recipient of the payment in plain text. Hence, they could perform censorship based on the service provider's identity (recall that statekeepers are usually other competing service providers). Thus, one wants all service providers to be treated equally. More precisely, the goal is to hide the service provider's identity from the statekeepers during the payment approval process. The rationale is that if the statekeepers do not know who the payment recipient (service provider) is, they cannot discriminate against a particular service provider by selectively blocking its payments. It is noted that a blanket DoS attack, where statekeepers do not approve any payment, is of course possible.

c. User identity based censoring. Statekeepers need to ensure whether they have already signed a transaction for a particular user and payment index. In a simple design as in previous systems the payment intent would simply contain the user's identity. Therefore, the statekeepers can discriminate against a particular user because their address is available in plaintext in a payment intent. This is arguably the most difficult problem to solve, because the statekeepers need to know some connection to the user's identity.

Privacy

Embodiments of the present invention leverage techniques introduced in private payment systems and combine it with a design of a system like Snappy that supports fast payments. In this regard, one of the problems is to devise a system that provides the same security guarantees as in fast payment systems, but does not compromise any privacy guarantees provided by private payment systems. The main challenges throughout a private payment and private settlement process are as follows:

Private payment process. In a naive design, one could devise a payment process identically to e.g. the Snappy payment system, with the only difference that the final step in the smart contract simply triggers a payment in an existing private payment system like Zether. Such a design has several flaws. First of all, it would violate the privacy guarantees of private payment systems, because Snappy discloses user's details. Furthermore, it would also violate the Snappy security guarantees. In particular, a service provider needs to check whether a user's or statekeeper's collateral is sufficient to cover the current and all pending transactions. Since all payments contain encrypted amounts, the payment process needs to provide additional mechanisms to enable such checks.

Private settlement process. Most problems arise with respect to correct processing of settlement claims. In particular, statekeepers need to verify whether there are conflicting transactions in the system, i.e. whether a particular user has created two different transaction for the same payment index.

According to embodiments, the present invention provides a payment method/system that supports fast, confidential and anonymous payments, as well as confidential settlements.

In order to account for censorship-resilience, embodiments of the invention implement at least one of payment value obfuscation, service provider identity obfuscation and user identity obfuscation.

Payment value obfuscation. One of the inventors' main observation is that statekeepers do not need to know the value of each approved payment. Previously, a Snappy transaction was uniquely identified given all four values, i.e. the Snappy index, the user's address, the service provider's address, and the payment value. However, it is sufficient to consider a transaction unique if the triplet containing only the payment index, the user's address, and the service provider's address is unique.

Service provider identity obfuscation. Further, it has been recognized that the Snappy protocol can be modified such that service provider addresses remain hidden from statekeepers during the payment approval, which prevents censorship against service providers. The main technical challenge is to hide the address such that it is still securely bound to the payment approval and can be later revealed for settlement if needed. In this context, embodiments of the present invention leverage Pedersen commitments where the service provider can blind the address for the duration of the payment approval, and evaluate the additional cost.

The idea is that once the service provider receives the initial payment intent $INT_c$ from the user, the service provider replaces their address in the payment intent by a Pedersen commitment $c=C(\tau_m, r)$, where r is a random blinding value. The statekeepers will sign the payment intent that contains the blinded service provider identity. The commitment will be only opened if the service provider needs to request a settlement, in which case an entity acting as an arbiter will verify it.

User identity obfuscation. According to embodiments of the invention, censorship is prevented by replacing the address of the user payment Intent with a randomized payment ID (RPID) that is generated using a verifiable random function (VRF) for each payment separately.

More precisely, at enrollment, the user may generate a VRF key-pair. The VRF public key is registered to the payment system's smart contract together with the user's deposit and the user keeps the secret key to themselves. For each new payment, the user uses the private key to generate a new RPID as VRF output using the current (monotonically increasing) payment index as the VRF input. The user also creates a VRF proof that allows the service provider to verify that the RPID was created correctly for the current payment index. Statekeepers approve only one payment per RPID.

The security and privacy guarantees of such mitigation rely on two properties of VRFs. The first property is uniqueness, which ensures that for the same VRF input (payment index, in the present case) only one correct VRF output (RPID, in the present case) can be generated. Because malicious users cannot create multiple RPIDs for the same index, and because statekeepers track double-spending per payment index, a malicious user cannot double-spend. The second property is pseudorandomness, which ensures that every RPID is unlinkable to the address of the user or any previous RPID used by the same user. This prevents statekeepers from censoring payments based on the identity of the user.

In order to account for the privacy of payments, i.e. to provide strong privacy guarantees during payment, embodiments of the invention leverage Zether-style transactions that confidentially (or potentially anonymously) transfer funds from the user to the service provider. These payments can be processed the same way as in Zether (i.e. encrypted payment values are transferred using zero-knowledge proofs). However, according to embodiments further improvements to the payment process may be introduced such that it provides a guarantee to the service provider. This consists of a user's additional zero-knowledge proof and a signature signing a settlement request which can be used later during settlement to show that the collateral is sufficient to cover the payment value.

As such, embodiments of the present invention provide a payment method/system realizing the following aspects:
1. Hiding the payments values using commitment schemes and using VRF to hide the user identity.
2. Using range proofs to prove balance at time of payments.
3. Combining the above with payment collateral systems to reach privacy-preserving and censorship resistant fast payments in the blockchain.

Embodiments of the present invention employ two types of accounts—user accounts and collateral accounts. User accounts can be used to freely transfer funds to other user accounts. Collateral accounts, on the other hand, are administered solely by a smart contract and are used during settlement claims. The main idea is for users to deposit a collateral to the smart contract. This collateral is used to provide a guarantee to a receiving service provider, such that they can accept the payment before it is finalized on the blockchain.

For both types of accounts, the balances are stored as ciphertexts. In this regard, it may be provided that the smart contract stores a dictionary that maps account addresses (i.e. ElGamal public keys) to ElGamal homomorphic encrypted values.

For user accounts, embodiments of the present invention assume the same model as in existing private payment systems, such as Zether (as disclosed in B. Bünz, S. Agrawal, M. Zamani, and D. Boneh: "Zether: Towards Privacy in a Smart Contract World, 07 2020, pp. 423-443. https://crypto.stanford.edu/~buenz/papers/zether.pdf, which is hereby incorporated herein by reference). In particular, accounts may be managed in epochs. A receiving account stores incoming transactions in a pending list and rolls them over into the account balance only at the end of each epoch. This prevents front-running of transactions. Furthermore, embodiment of the invention may leverage the same type of zero-knowledge proofs for user accounts as described in the above Zether reference.

Collateral accounts are similar to user accounts, however, they are administered differently. In particular, transfers apart from registration and deregistration can be only triggered internally by the smart contract during settlement. Furthermore, the statements of the zero-knowledge proofs are slightly different to the ones that may be required for user accounts. Specific details are described more in-depth further below.

According to embodiments, in order to use the system according to the present invention, users should ensure to meet the following conditions:
  Own a VRF (Verifiable Random Function) key pair used to create Random Payment IDs (RPID).
  Own an ElGamal key pair for a system user account which holds the user's main funds for payments.
  Own an ElGamal key pair for a system collateral account which is used during settlement.

To register the details in the system, it may be provided that the users trigger a registration process by initiating a blockchain transaction which contains the following details:
  Register the corresponding VRF public key to the system.
  Register the collateral account address which will be linked to the VRF public key.

Finally, upon registration the system's smart contract may create a new user entry C[c] in its state, which may contain the following details (as in the table shown in FIG. 4):
  The address corresponding to the user's collateral account.
  A new dictionary D of finalized transactions.
  A new dictionary O of observed transaction hashes.
  A new dictionary T (trace) of past settlement claims. Its first entry is initialised as $$C[c] \cdot T[0] \cdot idx \leftarrow \perp$$

and $$C[c] \cdot T[0] \cdot pool_c \leftarrow c_b,$$

where $c_b$ is the ciphertext corresponding to the initial balance of the user's collateral account.

With regard to service provider registration, before using the system, service providers need to ensure they meet the following conditions:
  Own a valid keypair for one main user account where the payments will be transferred to.
  Own a valid keypair for one secondary user account where settlements will be transferred to.
  The service provider has received a value $v_i$ from each statekeeper. This value is a fraction of each statekeeper's collateral that they have allocated to the service provider.

As will be appreciated by those skilled in the art, in the case where only confidential payments may be required and used, the main user account and the secondary user account can be the same.

To register the details in the system, service providers may trigger a service provider registration process by initiating a blockchain transaction that contains the following details:

Register the secondary user account address.

Finally, upon registration the system's smart contract creates a new user entry M[m] in its state containing (as in the Table shown in FIG. 4):

The secondary user account address that the service provider has submitted.

With regard to statekeeper registration, before using the system, statekeepers need to ensure they meet the following conditions:

Own a valid BLS (Boneh-Lynn-Shacham) keypair.

Own an ElGamal key-pair for a collateral account that is used during settlement.

Allocate a fraction of the total collateral to each service provider, i.e. create k values for each service provider, all values should add up to the total collateral amount.

Encrypt each value $v_i$ into a ciphertext $c_i$ with the ElGamal public key of the collateral account.

Send each allocated value $v_i$ to the corresponding service provider.

Create a zero-knowledge proof $\pi_{reg}$ that shows that the sum of all ciphertexts $\Sigma_{i=1}^{k} c_i$ is equal to the total collateral.

To register the details in the system, statekeepers may trigger a statekeeper registration process by initiating a blockchain transaction that contains the following details:

The BLS public key.

A proof of knowledge of the BLS private key to prevent rogue key attacks (as described in T. Ristenpart and S. Yilek, "The power of proofs-of-possession: Securing multiparty signatures against rogue-key attacks," in Advances in Cryptology—EUROCRYPT 2007, M. Naor, Ed. Berlin, Heidelberg: Springer Berlin Heidelberg, 2007, pp. 228-245)

All ciphertexts $c_i, \ldots, c_k$.

The zero-knowledge proof $\pi_{reg}$.

Finally, upon registration the system's smart contract may perform the following actions: (as in the Table shown in FIG. 4):

Verifies the proof of knowledge of the BLS secret key.

Verifies the zero-knowledge proof $\pi_{reg}$.

Creates a new entry S[s] in its state (according to the Table shown in FIG. 4) which contains:

The BLS public key.

The statekeeper's collateral account address.

A list of k ciphertexts corresponding to the allocated fraction to each service provider.

The most important function in the system is the payment process. This process, which may be triggered by a transaction signed by a user, transfers funds confidentially (or anonymously) to a particular service provider. This is the intended use case according to embodiments of the present invention, and in general this payment process should be successful—unless either a user or a statekeeper acts maliciously.

Next, the exact process and steps involved in creating and processing a fast transaction according to embodiments of the present invention will be described with reference to FIG. 5, in which method steps 1-8 are indicated. The notation follows the Tables shown in FIGS. 1-4, in particular FIG. 4, which provides a list of transaction details.

1. Payment Initialization

As shown at step 1 in FIG. 5, the user 110 creates a private payment intent $PINT_c$ which includes:

a payment index i, a random payment ID $RPID=VRFhash(sk_{vrf}, i)$, the address of the service provider's private collateral account m.

Next, the user 110 may create details for a confidential (or optionally anonymous) transaction:

Confidential payment. In this case, the user 110 may execute a Zether function, namely CreateTransferTx, with the inputs being the user's 110 ElGamal public key y, the service provider's 120 ElGamal public key $\bar{y}$, the user's 110 ElGamal secret key x, the user's 110 user account balance $b_f$, and the payment amount v. This method returns ci phertexts ($c^*, \bar{c}^*$), a zero-knowledge proof $\pi_{trans}$ (showing that the user's 110 balance is sufficient and that $c^*=\bar{c}^*$, and a signature $\sigma_{trans}$.

Anonymous payment. In the case of anonymous payments, the user 110 may execute another Zether function, namely CreateAnonTransferTx with inputs being an anonymity set $\mathbb{U}$ which contains both the user's 110 and the service provider's 120 accounts, the index $i_f$ of the user's 110 user account, the index $i_{to}$ of the service provider's user account, the user's 110 ElGamal secret key x, the balance $b_f$ of the user's 110 user account, the payment amount v, and the current state of the system's smart contract 150. This method returns a set of ciphertexts $\{c_1^*, \ldots, c_2^*\}$, a nonce u, and a zero-knowledge proof $\pi_{trans}$ Additionally, the user 110 may create a second zero-knowledge proof $\pi_{col}$. This proof is over the user private collateral's balance. In particular, it may show that the sum of all pending payments including the current payment is less than the user's 110 current private collateral balance. The current collateral balance can be found in the trace C[c].T. More formally, it may hold that $$\sum_{\tau' \in S_c} \tau'_v + \tau_v \le C[c].T[n],$$

where n denotes the final index of the list C[c].T. Such a proof can be created and verified efficiently using $\Sigma$-Bullets, which denotes a hybrid system based on $\Sigma$-Protocols combined with Bulletproofs (for reference, see B. Bünz, J. Bootle, D. Boneh, A. Poelstra, P. Wuille, and G. Maxwell, "Bulletproofs: Short proofs for confidential transactions and more," Cryptology ePrint Archive, Report 2017/1066, 2017, https://eprint.iacr.org/2017/1066, which is hereby incorporated herein by reference).

According to embodiments of the present invention, the user 110 may send to the service provider 120 the following details:

the payment intent $PINT_c$, the VRF public key $pk_{vrf}$, the VRF proof $\pi_{vrf}=VRFprove(sk_{vrf}, i)$, the encrypted payment amounts, the zero-knowledge proof $\pi_{col}$, the list $S_c$ of pending transactions.

2 User Evaluation

After payment initialization, as shown in FIG. 5, at step 2 the service provider 120 may perform the following checks:

For each index $j \in \{1, \ldots, PINT_c[i]\}$, there exists an approved transaction $\tau'$ with index j such that either $\tau \in BC[c]$ or $\tau \in S[C]$, the received $pk_{vrf}$ is registered on the system's smart contract 150, VRFverify $(pk_{vrf}, i, \pi_{vrf})=T$ VRFproof2hash $(\pi_{vrf})=$RPID verifies the details of the confidential/anonymous payment, in particular the correctness of the zero-knowledge proof $\pi_{trans}$ and the signature $\sigma_{trans}$, verifies the additional zero-knowledge proof $\pi_{col}$ to ensure that the user's 110 private collateral is sufficient to cover all pending transactions and the current transaction.

3 Service Provider Address Obfuscation

According to embodiments of the present invention, it may be provided that the service provider 120 modifies the payment intent $PINT_c$ to hide their collateral address. That is, the service provider 120 replaces their collateral address by the commitment $c_m=C(m, r_m)$, where $r_m$ is a random blinding factor.

The service provider 120 may then transmit (e.g. via broadcasting) the modified payment intent $PINT_c$ to a majority of statekeepers 130.

Figure 6:
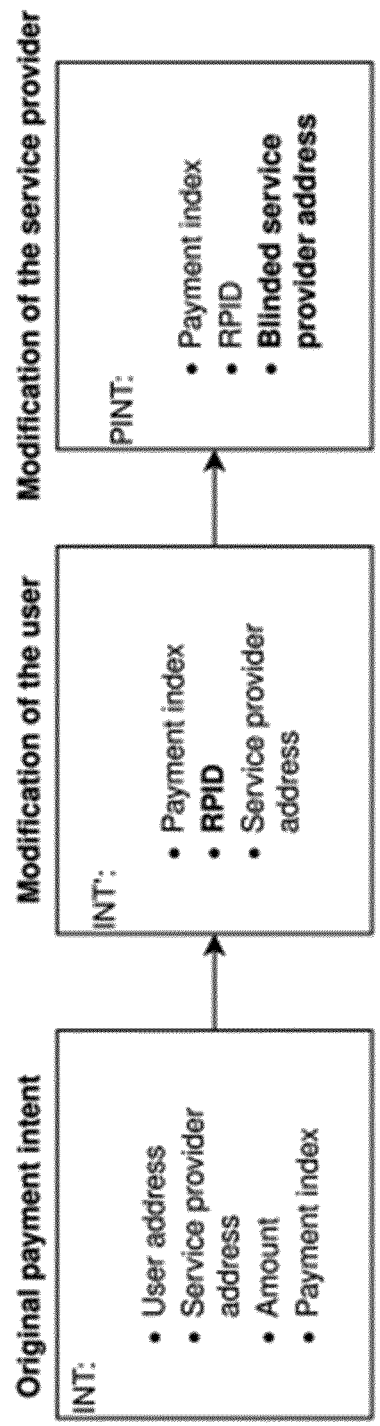
FIG. 6 is a diagram showing modifications of a payment intent performed in accordance with an embodiment of the present invention.

Modifications payment intent $PINT_c$ performed by the service provider 120 and by the user 110 are exemplary illustrated in FIG. 6.

4 Payment Approval

According to embodiments of the present invention, each statekeeper 130 may evaluate the payment intent received from the service provider 120 as follows:

They check from their local list that they have not already approved a payment with the same RPID. If a matching RPID is found, they abort and notify the service provider 120 accordingly.

On the other hand, if a statekeeper 130 has not seen the respective RPID value for the same index before, they approve the payment and send it back to the service provider 120. According to embodiments of the invention, approving a payment may be performed by computing a BLS signature $\sigma_i=\text{Sign}(PINT_c, sk_{sk})$.

The statekeeper 130 may append the approved RPID value to their local list.

5 Statekeeper Evaluation

If a majority of statekeepers 130 rejects the payment intent, the service provider 120 notifies the user 110 and aborts the payment process.

Upon success, i.e. at least half of the statekeepers 130 approved the payment intent, the service provider 120 checks $Vf(PINT_c, 94_i, pk_{sk})$ succeeds for all signatures and upon success, aggregates them into $A=\text{AggrSig}(\{\sigma_i, \ldots, \sigma_n\})$.

In addition to the verification of the signatures and their aggregation, the service provider 120 may check that each statekeeper 130 who has approved the intent allocated enough collateral to the service provider 120. This can be done easily be-cause the service provider 120 knows the corresponding fraction of each statekeeper's 130 collateral in plaintext.

According to an embodiment of the invention, the service provider 120 stores the payment intent $PINT_c$ together with the blinding factor $r_m$, the VRF proof $\pi_{vrf}$, and the zero-knowledge proof $\pi_{col}$ in their long-term state. This is to be able to claim settlement later.

Furthermore, the service provider 120 may send the aggregated BLS signature A and the blinding factor $r_m$ to the user 110.

6 Check Commitment

According to an embodiment of the invention, as shown at step 6 in FIG. 5, the user 110 verifies the aggregated BLS signature A.

Furthermore, the user 110 may check that the service provider's 120 commitment contained in the payment intent is equal to $C(m, r_m)$.

7 Transaction Finalization

According to an embodiment of the invention, as shown at step 7 in FIG. 5, the user 110 creates a final transaction containing one or more of the following details:

To: system's smart contract address,
From: arbitrary blockchain address,
payment index,
RPID: RPID,
committed address $c_m$,
confidential payment: payment data (y, $\bar{y}$, c*, $\bar{c}$*, $\pi_{trans}$, $\sigma_{trans}$), or anonymous payment: payment data $\mathbb{U}$, $\{c_1^*, \ldots, c_2^*\}$, $\pi_{trans}$, $\sigma_{trans}$,
aggregated BLS signature A,
approving quorum q,
operation,
zero-knowledge proof $\pi_{trans}$,
user's system signature $\sigma_{trans}$,
skipped index.

The user 110 sends to the service provider 120 the created transaction (signed through $\sigma_{trans}$). According to an embodiment, the user 110 may additionally send a signature $\sigma_{claim}$ that signs the details of a (potential) settlement request, as will be described in more detail further below.

8 Payment Acceptance

Upon receipt of the final transaction from the user 110, as shown at step 8 in FIG. 5, the service provider 120 verifies that the user 110 correctly constructed the transaction and correctly signed all details, namely in accordance with a predefined payment protocol. They check that the user has not replaced, omitted, or modified any of the values.

Once the user's 110 transaction is verified, the service provider 120 can safely hand over the goods (for which the funds are intended) to the user 110.

Finally, the service provider 120 broadcasts the transaction to the blockchain 140.

9 Payment Logging

According to an embodiment of the invention, upon receipt of the payment, the system's smart contract 150 finalizes the confidential (or anonymous) payment which transfers funds from the user 110 to the service provider 120.

Furthermore, upon success, the smart contract 150 may store the following details in a list C[c].D[i] of the user's 110 finalized transactions, where i is the current transaction's index:

the RPID, the service provider's committed address $c_m$, the aggregated approval signature A, the quorum q of the approving statekeepers.

As will be appreciated by those skilled in the art, because RPIDs are members of a group $\mathbb{Z}_n$, there is a finite number of them. Therefore, there is a non-zero, but very low probability that the user 110 generates an RPID value that already exists. If this occurs, the statekeepers 130 reject the payment intent and the service provider 120 can notify the user 110 accordinglly. The user 110 can restart the payment procedure from the beginning but this time with payment index i+1. According to an embodiment of the invention, in the final transaction, an additional field is added to notify that one index has been skipped because of a collision.

In a simple implementation of the payment process as described above, the statekeepers 130 would maintain an ever-increasing list of already approved RPID values. According to an embodiment of the present invention, it may be provided that the statekeepers 130, to reduce their storage requirement, could prune their local list and periodically delete sufficiently old RPID values (e.g. older than 24 h). Such pruning is safe to perform because service providers 120 could detect reuse of sufficiently old payment index values from the blockchain 140.

Embodiments of the present invention address the case, in which a transaction does not appear on the blockchain 140 after a reasonable (e.g. predefined or configurable) time. It may be provided that in such case, the service provider 120 can initiate a settlement process. It is possible that the payment fails due to a malicious user 110 double-spending their funds or due to an equivocating statekeeper 130 signing conflicting transactions. In both cases, it may be provided that the service provider 120 is eligible to be refunded by the system's smart contract 150, given that the service provider 120 has followed to payment protocol.

According to embodiments of the invention, it may be provided that a service provider 120 can claim settlement from either the statekeeper's 130 collateral or the user's 110 collateral. Hereinafter, both cases will be described, wherein τ denotes the transaction that is being claimed, and τ' denotes another approved transaction that conflicts with τ.

Claim Statekeeper

In the case where there exist conflicting transactions signed by the same statekeeper 130, the service provider 120 can initiate a claim from the equivocating statekeeper's 130 collateral. To initiate the settlement request, the service provider 120 may submit a transaction to the system, wherein the request may include one or more of the following details:

The details of the payment intent PINT, that the service provider 120 wants to settle, the aggregated BLS signature A that signs the payment intent $PINT_c$, the quorum q of signers that signed the payment intent, the blinding factor $r_m$, the VRF proof $\pi_{vrf}$, a signature $\sigma_m$ that signs the details of the settlement request with the public key $\overline{y}^{\tau}$ corresponding to the service provider's 120 secondary account that is registered in the system, two ciphertexts ($c^*$, $\overline{c}^*$) that encrypt the payment amount with public keys $y_{sk}$ and $\overline{y}_m$, respectively (wherein public key $y_{sk}$ corresponds to the equivocating state-keeper's 130 collateral account, and public key $\overline{y}_m$ corresponds to the service provider's 120 secondary user account), the address m of the service provider's 120 secondary user account, the address of the equivocating statekeeper's 130 collateral account, a list of conflicting transactions $\mathbb{T}_{cnfl}$ (for efficiency, it may be assumed that $|\mathbb{T}_{cnfl}|=1$) containing the details of τ', a zero-knowledge proof $\pi_{claim}$ which shows that both $c^*$ and $\overline{c}^*$ encrypt the same value and that the equivocating statekeeper's 130 collateral is sufficient to cover the current transaction that is being claimed (for efficiency, it is assumed that at most one statekeeper 130 is claimed and hence the service provider 120 needs to submit only one such zero-knowledge proof for a particular equivocating statekeeper 130).

According to an embodiment of the present invention, the settlement request may be processed as follows: Once the payment system's smart contract 150 receives the above details in a blockchain 140 transaction, it performs the following actions:

Verifies that the transaction being settled is not yet contained in its state, verifies that the service provider's 120 collateral account is registered in the payment system's smart contract 150, verifies that the equivocating statekeeper's 130 collateral account is registered in the payment system's smart contract 150, verifies the service provider's 120 signature $\sigma_m$, verifies that the statekeeper 130 being claimed is indeed contained in both quora $\tau_q$ and $\tau'_q$, verifies the aggregated BLS signatures $\tau_A$ and $\tau'_A$ given the quora $\tau_q$ and $\tau'_q$, respectively, verifies the commitment by checking that $\tau_{cm}=C(m, r_m)$, verifies the correctness of the VRF proof $\pi_{vrf}$ by checking that $$\text{VRFverify}(C[c]\cdot p_{vrf}, i, \pi_{vrf})=T$$

$$\text{VRFproof2hash}(\pi_{vrf})=\tau_{RPID}$$

verifies the correctness of the zero-knowledge proof $\pi_{claim}$, based on the (encrypted) fraction of the collateral balance that the statekeeper 130 has allocated to the service provider 120, once all checks succeed, the payment system's smart contract 150 subtracts the encrypted amount $c^*$ from the statekeeper's 130 collateral account, and adds $\overline{c}^*$ to the service provider's 120 secondary user account (this can be done in line with the usual transfer process), once the corresponding amounts are transferred, the payment system's smart contract 150 stores the details of the transaction that was claimed in the list C[c].D of the user's 110 finalized transactions, returns successfully.

Claim User

In the case where there exist no conflicting transactions, the service provider 120 can initiate a claim from the user's 110 collateral. To initiate the settlement request, the service provider 120 may create a transaction with one or more of the following details:

The details of the payment intent $PINT_c$ that the service provider 120 wants to settle, the aggregated BLS signature A that signs the payment intent $PINT_c$, the quorum q of signers that signed the payment intent, the blinding factor $r_m$, the VRF proof $\pi_{vrf}$, a signature $\sigma_c$ that signs the details of the settlement request with the public key $y_c$ corresponding to the user's 110 collateral account, a signature $\sigma_m$ that signs the details of the settlement request with the public key $\overline{y_m}$ corresponding to the service provider's 120 secondary account that is registered in the system, two ciphertexts ($c^*$, $\overline{c^*}$) that encrypt the payment amount with the public keys $y_c$ and $\overline{y_m}$, respectively, the address m of the service provider's 120 collateral account, a list $\mathbb{T}_p$ of transactions that were pending during approval, the zero-knowledge proof $\pi_{col}$ which shows that both $c^*$ and $\overline{c^*}$ encrypt the same value and that the user's 110 collateral is sufficient to cover all transactions in $\mathbb{T}_p$ together with the current transaction that is being claimed.

According to an embodiment of the present invention, the settlement request may be processed as follows: Once the payment system's smart contract 150 receives the above details in a blockchain 140 transaction, it performs the following actions:

Verifies that the transaction being settled is not yet contained in its state, verifies that the service provider's 120 collateral account is registered in the payment system's smart contract 150, verifies that the equivocating statekeeper's 130 collateral account is registered in the payment system's smart contract 150, verifies the service provider's 120 signature $\sigma_m$, verifies the user's 110 signature for transaction $\tau$, verifies that there is no transaction in its state that conflicts with $\tau$ or any of the pending transactions. According to embodiments, this may happen in two steps:

the payment system's smart contract 150 looks up the list of finalized transactions, i.e. for $\tau$ and all $\tau' \in \mathbb{T}_p$, it checks that $C[\tau_c].D[\tau_i]$ and $C[\tau'_c].D[\tau'_i]$ do not conflict with $\tau$, the payment system's smart contract 150 looks up the list of observed transactions, i.e. for $\tau$ and all $\tau' \in \mathbb{T}_p$, it checks that $C[\tau_c].O[\tau_i].h \neq C[\tau'_c].O[\tau'_i].h$, verifies the user's 110 signature for each of the transactions in $\mathbb{T}_p$, verifies the aggregated BLS signature $\tau_A$ given the quorum $\tau_q$, verifies the aggregated BLS signatures $\tau'_A$ given the quorum $\tau'_q$ for all $\tau' \in \mathbb{T}_p$, verifies the commitment by checking that $\tau_{cm} = C(m, r_m)$, verifies the correctness of the VRF proof $\pi_{vrf}$ by checking that $$VRFverify(C[c].pk_{vrf}, i, \pi_{vrf}) = T$$

$$VRFproof2hash(\pi_{vrf}) = \tau_{RPID}$$

looks for the past collateral balance stored in $C[c].T[j].pcol_c$ where j is the highest index such that the conditions $$[c].T[j].idx < \tau_i \lor C[c].T[j].idx = \bot$$

and $$\not\exists \tau' : \tau' \in \mathbb{T}_p \land C[c].T[j].idx = \tau_i$$

are met—in other words, the entry may satisfy that its corresponding system index is smaller than the index $\tau_i$ of the settled transaction, and that no transaction with the same system index idx is contained in the set of pending transactions provided by the service provider 120, verifies the zero-knowledge proof $\pi_{col}$, i.e. that the past collateral balance found in the previous step is sufficient to cover the settled transaction and all transactions in $\mathbb{T}_p$ and that ($c^*$, $\overline{c^*}$) encrypt the same value, once all checks succeed, the payment system's smart contract 150 subtracts the encrypted amount $c^*$ from the statekeeper's 130 collateral account, and adds $\overline{c^*}$ to the service provider's 120 secondary user account (this can be done in line with the usual transfer process), once the corresponding amounts are transferred, the payment system's smart contract 150 appends a new entry $$C[c].T[n+1].idx \leftarrow \tau_i$$

and $$C[c].T[n+1].pcol_c \leftarrow pcol^*_c,$$

where n is the length of the list T and $pcol^*_c$ is the user's 110 updated collateral balance, the payment system's smart contract 150 stores the details of the settled transaction in the list $C[c].D$ of the user's 110 finalized transactions, finally, for each pending transaction $\tau' \in \mathbb{T}_p$ that is not yet finalized in $C[c].D$ such that $C[c].O[\tau'_i].h = \bot$, the payment system's smart contract 150 sets $$C[c].O[\tau'_i].h \leftarrow H(PINT_C),$$

where H is a collision-resistant hash function (in other words, the smart contract logs the hash of the payment intent if it has not yet been finalized and only observed now), returns successfully.

The fast payment method/system according to embodiments as disclosed herein provides the advantage of censorship-resilience. During approval, the only way for statekeepers to learn additional information about the transaction is by inspecting the payment intent. In this case, they are unable to perform censoring on the payment amount as it is completely removed from the intent. Furthermore, they cannot learn the service provider's identity, as Pedersen commitments are perfectly hiding and the blinding value is never disclosed to the statekeepers. It can be observed that a dictionary attack on the RPID is impossible, as the statekeepers would need to learn the VRF proof which is not provided to them at any point. It is recalled that the service providers have an economic incentive to protect privacy. Therefore, also the user's identity remains hidden.

The fast payment method/system according to embodiments as disclosed herein provides the further advantage of guaranteed funds. Once a service provider's payment intent is approved and they followed the protocol, they may be guaranteed to receive the funds, even if the payment fails. This guarantee is trivially satisfied if the payment succeeds. If the payment fails, it has to be shown that the payment system's smart contract will always accept a service provider's settlement request if the service provider has followed the protocol.

In the statekeeper settlement, the only difference to the prior art designs of fast payment systems such as Snappy is that the final transaction while claiming a statekeeper is performed through the confidentially. As a benign service provider creates a correct zero-knowledge proof on the collateral account balance, such a transaction is thus guaranteed to succeed.

In the case where a user is claimed, it has to be shown that the provided zero-knowledge proof $\pi_{col}$ always succeeds. The main idea here is that for a correct proof to not succeed, the payment system's smart contract would need to find a different past collateral entry. By design, this entry would be corresponding to a transaction τ' with a lower index and which was settled later (after the creation of the zero-knowledge proof). If τ' was pending during the creation of the zero-knowledge proof, then it is the service provider's own fault, because they did not account for this transaction in the proof. On the other hand, if τ' was not pending (i.e. finalized), the service provider did not follow the protocol, because they should have created the zero-knowledge proof on the more recent collateral balance. It can be seen that in any case, if the proof fails, the service provider did not follow the protocol.

The fast payment method/system according to embodiments as disclosed herein provides the further advantage of correct settlement. For the statekeeper settlement, the payment system's smart contract verifies the zero-knowledge proof which shows that the private statekeeper collateral suffices to cover the current transaction and all pending transactions. Therefore, it is guaranteed that the statekeeper's collateral is not overspent, given that an adversary is not able to create false proofs.

The argument for correct user settlement is a bit more involved, and we will only describe a high-level intuition. The main idea is that the user creates a zero-knowledge proof on the current collateral during payment. During settlement, the payment system's smart contract backtraces its state to find the corresponding past collateral. One knows that if the state Sc (see Table in FIG. 1) is compatible with the transaction (i.e. the service provider did its due diligence) and there are no conflicting transactions in the system, then the user's collateral is sufficient to cover the costs. Hence, the payment system's smart contract checks that there are no conflicting transactions and finds a past collateral that is compatible with the information the service provider provided. Proof of compatibility provides the attached zero-knowledge proof.

The fast payment method/system according to embodiments as disclosed herein provides the further advantage of payment privacy. During payment, no benign service provider nor the user reveals their identity or the payment amount at any point during payment. Thus, the same guarantees with regards to confidentiality and anonymity as in Zether apply to the payment process according to embodiments of the present invention.

The fast payment method/system according to embodiments as disclosed herein provides the further advantage of settlement privacy. The settlements do not support anonymity. However, they support confidentiality of both the user's and statekeeper's collateral. For statekeepers, the total balance of their collateral remains private if not all service providers disclose every allocated fraction of the total collateral. If only one service provider keeps their allocation private, the exact total amount remains private. The only information that could be learned from revealing the fractional allocations is a lower bound on the statekeeper's collateral. This is due to the fact that the statekeeper does not share the disclosed total value with any other party—only a fraction to each service provider. Furthermore, all operations on the collateral can be performed either through zero-knowledge proofs or through encrypted homomorphic operations.

Furthermore, the user's collateral remains completely private. Neither the user nor the service provider disclose their identities and the payment amount at any point, and all operations on user collaterals are performed through zero-knowledge proofs. Hence, it can be concluded that the same privacy guarantees apply as in Zether. As will be appreciated by those skilled in the art this holds under the assumption that neither the user nor the service provider disclose the payment amount publicly in plaintext. This is a fair assumption because both parties have an economic incentive to protect each other's privacy.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for fast blockchain payment, the payment involving a transfer of funds from an account of a user to a private collateral account of a service provider, the method comprising:

receiving, by the service provider, a private payment intent from the user, the private payment intent including a payment index, a random payment ID, and an address of the private collateral account of the service provider;

modifying, by the service provider, the private payment intent by replacing the address of private collateral account of the service provider by a commitment and providing the modified payment intent to a majority of statekeepers of a blockchain;

receiving, by the service provider, payment approvals from statekeepers of the blockchain, each payment approval including the modified payment intent signed with a private key of a respective statekeeper;

evaluating, by the service provider, the received payment approvals, aggregating successfully evaluated payment approvals, and transmitting the aggregation result to the user; and receiving, by the service provider, a final transaction created by the user after having verified the aggregation result, verifying that the user correctly constructed the final transaction according to a given protocol, and accepting the payment in case of successful verification of the final transaction;

wherein the modifying, by the service provider, the private payment intent received from the user includes replacing the address of the private collateral account of the service provider by the commitment $c_m = C(m, r_m)$, where m is the address of the private collateral account of the service provider, $r_m$ is a random blinding factor, and C is a commitment function.

2. The method according to claim 1, wherein the random payment ID of the private payment intent is generated by computing a verifiable random function (VRF) hash of the payment index.

3. The method according to claim 1, further comprising:
evaluating, by the service provider, the private payment intent received from the user by verifying the correctness of a zero-knowledge proof computed by the user to show that a balance of the user is sufficient for executing the payment.

4. The method according to claim 1, further comprising:
evaluating, by the service provider, the private payment intent received from the user by verifying the correctness of a zero-knowledge proof computed by the user over a collateral balance of the user to show that a sum of all pending payments including the current payment is less than a current collateral balance of the user.

5. The method according to claim 1, wherein the payment approvals from the statekeepers of the blockchain include a BLS signature computed by the respective statekeeper over the modified payment intent using the private key of the respective statekeeper.

6. The method according to claim 1, wherein the service provider, upon receiving payment approvals from at least half of the statekeepers, verifies the signatures of the statekeepers of the modified payment intent using a public key of the respective statekeeper and aggregates the successfully verified signatures to obtain an aggregated approval signature.

7. The method according to claim 1, wherein a smart contract running in the blockchain is used to administer collateral accounts of the user, the service provider and each of the statekeeper of the blockchain, wherein the smart contract stores a dictionary that maps account addresses to ElGamal homomorphic encrypted values.

8. The method according to claim 1, wherein a smart contract running in the blockchain performs, upon receipt of the payment, the following actions:
finalizing the payment which transfers funds from the user to the service provider; and
upon success, storing the random payment ID, the committed address of the service provider, the aggregated approval signature, and a quorum of the approving statekeepers in a list of finalized transactions of the user.

9. The method according to claim 8, wherein the final transaction of the user in the smart contract is executed using encrypted payment amounts on private accounts of the user and the service provider.

10. The method according to claim 1, wherein a smart contract running in the blockchain is used to process settlement requests initiated by the service provider in case the transaction does not appear on the blockchain after a predefined or configurable time.

11. The method according to claim 10, further comprising:
directing, by the service provider, a settlement request to the user or to a statekeeper to be refunded through a confidential payment either from a private collateral account of the user or a private collateral account of the respective statekeeper.

12. A system for fast blockchain payment, the payment involving a transfer of funds from an account of a user to a private collateral account of a service provider, the system comprising:
processor circuitry configured to:
receive, from a user, a private payment intent from the user, the private payment intent including a payment index, a random payment ID and an address of the private collateral account of the service provider;
modify the private payment intent by replacing the address of the private collateral account of the service provider by a commitment and provide the modified payment intent to a majority of statekeepers of a blockchain;
receive payment approvals from the statekeepers of the blockchain, each payment approval including the modified payment intent signed with a private key of the respective statekeeper;
evaluate the received payment approvals, aggregate successfully evaluated payment approvals, and transmit the aggregation result to the user; and
receive a final transaction created by the user after having verified the aggregation result, verify that the user correctly constructed the final transaction according to a given protocol, and accept the payment in case of successful verification of the final transaction;
wherein the modify the private payment intent received from the user includes replacing the address of the private collateral account of the service provider by the commitment $c_m = C(m, r_m)$, where m is the address of the private collateral account of the service provider, $r_m$ is a random blinding factor, and C is a commitment function.

13. A non-transitory processor readable medium having stored thereon processor executable instructions, when executed by a processor causes the processor to perform a method for fast blockchain payment, the payment involving a transfer of funds from an account of a user to a private collateral account of a service provider, the method comprising:
receiving, by the service provider, a private payment intent from the user, the private payment intent including a payment index, a random payment ID and an address of the private collateral account of the service provider;
modifying, by the service provider, the private payment intent by replacing the address of the private collateral account of the service provider by a commitment and providing the modified payment intent to a majority of statekeepers of a blockchain;

receiving, by the service provider, payment approvals from blockchain's statekeepers, each payment approval including the modified payment intent signed with a private key of the respective statekeeper;

evaluating, by the service provider, the received payment approvals, aggregating successfully evaluated payment approvals, and transmitting the aggregation result to the user; and receiving, by the service provider, a final transaction created by the user after having verified the aggregation result, verifying that the user correctly constructed the final transaction according to a given protocol, and accepting the payment in case of successful verification of the final transaction;

wherein the modifying, by the service provider, the private payment intent received from the user includes replacing the address of the private collateral account of the service provider by the commitment $c_m = C(m, r_m)$, where m is the address of the private collateral account of the service provider, $r_m$ is a random blinding factor, and C is a commitment function.

* * * * *